US006461475B2

(12) United States Patent
Freeburn

(10) Patent No.: US 6,461,475 B2
(45) Date of Patent: Oct. 8, 2002

(54) BASE SHEET FOR WALLCOVERINGS

(75) Inventor: Harold Freeburn, Osgoode (CA)

(73) Assignee: Domtar Inc., Montreal (CA)

( * ) Notice: Subject to any disclaimer, the term of this patent is extended or adjusted under 35 U.S.C. 154(b) by 0 days.

(21) Appl. No.: 09/870,053

(22) Filed: May 30, 2001

(65) Prior Publication Data

US 2001/0031312 A1 Oct. 18, 2001

Related U.S. Application Data

(62) Division of application No. 09/455,880, filed on Dec. 6, 1999.

(51) Int. Cl.$^7$ ............... D21H 27/20; D21H 27/18; D21H 23/24
(52) U.S. Cl. ............... 162/136; 162/137; 162/183; 162/134; 427/391; 427/361; 427/331; 442/85; 428/206; 428/195
(58) Field of Search ............... 162/135–137, 162/183–185, 123, 134, 140, 127; 427/391, 361, 209–210, 211, 256, 331; 442/59, 63, 85, 86, 297, 238; 428/195, 95–96, 206

(56) References Cited

U.S. PATENT DOCUMENTS

| | | | | |
|---|---|---|---|---|
| 1,738,591 A | * | 12/1929 | Lannoye ............... | 162/134 |
| 1,969,592 A | * | 8/1934 | Yoerg ............... | 162/135 |
| 2,949,382 A | * | 8/1960 | Dickerman et al. ......... | 427/211 |
| 3,130,176 A | * | 4/1964 | Zdanowski et al. ......... | 525/227 |
| 3,293,115 A | * | 12/1966 | Lucken ............... | 162/184 |
| 4,140,566 A | | 2/1979 | Burton et al. ............... | 156/219 |
| 4,460,643 A | | 7/1984 | Stevens et al. ............ | 428/284 |
| 4,510,019 A | | 4/1985 | Bartelloni ............ | 162/141 |
| 5,126,010 A | | 6/1992 | Kobayashi et al. ......... | 162/135 |
| 5,302,404 A | | 4/1994 | Rissanen et al. ............ | 428/195 |
| 5,441,784 A | | 8/1995 | Smith ............... | 428/40 |
| 5,541,002 A | | 7/1996 | Hosoi et al. ............ | 428/537.5 |
| 5,616,409 A | | 4/1997 | Matsuda et al. ............ | 428/32 |
| 5,635,279 A | | 6/1997 | Ma et al. ............... | 428/174 |
| 5,637,196 A | | 6/1997 | Ogawa et al. ............ | 162/135 |
| 5,654,039 A | * | 8/1997 | Wenzel et al. ............ | 427/391 |
| 5,709,976 A | | 1/1998 | Malhotra ............... | 430/124 |
| 5,714,270 A | | 2/1998 | Malhotra et al. ......... | 428/537.5 |
| 5,895,557 A | | 4/1999 | Kronzer ............... | 162/168.1 |
| 5,900,115 A | | 5/1999 | Kuroyama et al. ......... | 162/135 |
| 5,952,091 A | | 9/1999 | Horand et al. ............ | 428/323 |
| 6,015,620 A | | 1/2000 | Schwarz, Jr. ............ | 428/411.1 |
| 6,022,448 A | * | 2/2000 | Eriksson et al. ............ | 162/123 |
| 6,200,668 B1 | | 3/2001 | Kronzer ............... | 428/195 |
| 6,284,097 B1 | * | 9/2001 | Wulz et al. ............... | 162/137 |

* cited by examiner

*Primary Examiner*—Jose Portuna
(74) *Attorney, Agent, or Firm*—Pearne & Gordon LLP

(57) ABSTRACT

A paper-based sheet for wallcoverings that is made in a single pass on a standard paper making machine is described. The sheet has a print side and a barrier side and is made from softwood pulp in an amount of about 15% to about 40% by dry weight; hardwood pulp in an amount of about 30% to about 55% by dry weight; and, mineral filler in an amount of about 15% to about 30% by dry weight. A first coating is applied to the print side of the sheet in an amount of about 5 to about 20 gm/m$^2$ dry weight. A second coating is applied to the barrier side of the sheet in an amount of about 2.5 to about 10 gm/m$^2$ dry weight. The advantage is a strong, durable, alkaline wallcovering that is less expensive to produce, and provides a smooth print surface.

3 Claims, No Drawings

BASE SHEET FOR WALLCOVERINGS

CROSS-REFERENCE TO RELATED APPLICATIONS

This application is a division of U.S. patent application Ser. No. 09/455,880 filed Dec. 6, 1999.

MICROFICHE APPENDIX

Not Applicable.

TECHNICAL FIELD

The present invention relates to a paper-based sheet for wallcoverings, and in particular to an unsaturated paper base sheet suitable for making wallpaper.

BACKGROUND OF THE INVENTION

Paper-based wallcoverings (e.g. wallpaper) are normally formed as a layered structure of a base sheet and multiple coating layers applied to either side of the base sheet. A typical paper-based wallcovering of this type is disclosed in U.S. Pat. No. 5,441,784 (Smith), which issued on Aug. 15, 1995.

The base sheet is normally composed of a cellulose fiber paper substrate having an open structure, which is saturated (e.g. to approximately 10 to 15% of total dry weight) with a latex emulsion. Successive layers of ground coating, printing, scrub resistant and prepaste coatings are later applied to this saturated paper base sheet to form the finished wallcovering product.

Latex saturation of the paper substrate provides water resistance, wet strength, flexibility and softness to the finished wallpaper product. However, the use of latex saturated paper substrate involves a number of drawbacks. In particular, latex materials used for saturating the paper substrate are highly water-resistant after drying and curing. A hydrophobic material (e.g. wax) is usually added to the latex saturant to provide additional water repellency. The resulting base sheet (or wallcovering products made with it) cannot be recycled in the paper making process because of difficulties in rewetting the composite; removing the latex; and the undesirability of accumulating sticky latex deposits on paper machine wires and felts. Additionally, in order to permit penetration of the latex saturant, the paper substrate tends to be very "open". This results in a rough, porous surface which in turn requires heavy coating applications in order to achieve an acceptable printing surface. Furthermore, the latex saturated paper substrate must be manufactured in a first process, and the coatings must be applied to the finished paper substrate in a second process. Consequently, the manufacture of the base sheet is necessarily a two-step process.

The two step manufacturing process required to form the base sheet, and the heavy coating layers which must be subsequently applied to achieve an acceptable printing surface, are important factors contributing to the cost of the finished wallcovering product.

Accordingly, there remains a need for a base sheet for wallcoverings which is manufactured in a single operation, is recyclable in the paper making process, and possesses properties suitable for making high quality wallcovering products.

SUMMARY OF THE INVENTION

An object of the present invention is to provide a base sheet for wallcoverings which employs an unsaturated paper substrate.

A further object of the present invention is to provide a base sheet for wallcoverings which is manufactured in a single operation.

Another object of the present invention is to provide a base sheet for wallcoverings in which a surface suitable for printing can be achieved by application of a comparatively light coating to a surface of the paper substrate.

A still further object of the present invention is to provide a base sheet for wallcoverings which is recyclable in the paper making process using current recycling methods.

Yet another object of the invention is to provide an alkaline base sheet for wallcoverings.

Accordingly, an aspect of the present invention provides a base sheet for wallcoverings. The base sheet comprises an unsaturated paper substrate having a print side and a barrier side. The paper substrate comprises: softwood pulp in an amount of about 15% to about 40% by dry weight; hardwood pulp in an amount of about 30% to about 55% by dry weight; and mineral filler in an amount of about 15% to about 30% by dry weight. A first coating is disposed on the print side of the paper substrate in an amount of about 5 to about 20 gm/m² dry weight. A second coating is disposed on the barrier side of the paper substrate in an amount of about 2.5 to about 10 gm/m² dry weight.

Preferably, the softwood pulp and the hardwood pulp are Kraft pulps.

In an embodiment of the invention, the mineral filler comprises one or more of calcium carbonate, titanium dioxide and clay In an embodiment of the invention, the base sheet is made in a single pass through a paper-making machine. In this case, the first and second coatings are preferably applied to the paper substrate downstream of dewatering, press and primary drying sections of the papermaking machine, and upstream of secondary drying and calendering sections of the paper-making machine.

In an embodiment of the invention, the first and second coatings comprise one or more of styrene acrylic, vinyl acrylic, acrylic and vinyl acetate. Preferably, the first and second coatings further comprise one or more of: a viscosity modifier; a hydrophobic sizing agent; an insolubalizer; a dispersant; a pH adjuster; and, an antifoam agent. Preferably, the first and second coatings further include a pigment, which may comprise one or more of calcium carbonate and clay.

The invention provides a non-saturated base sheet using wet strength and hydrophobic sizing agents for water resistance. Softness and flexibility of the finished base sheet are achieved by adjusting the proportions of pulp fibers and mineral filler content. A print side "ground" coating is applied to one side of the paper followed by a water resistant barrier coating consisting primarily of latex and pigments applied to the opposite side. The resulting coated two side (C2S) base sheet is preferably calendered to the required print side smoothness using present technology. Preferably, the latex content of the finished base sheet is similar to that of a conventional C2S printing paper, and the wallcovering can be recycled where desired using standard wet strength repulping technology.

The base sheet of the present invention can be printed with all conventional printing methods currently used within the industry, and may be prepasted with natural or synthetic pastes. The base sheet is alkaline and therefore resists deterioration better than prior art acid base sheets.

DETAILED DESCRIPTION OF THE PREFERRED EMBODIMENT

The present invention provides a base sheet for wallcoverings (e.g. wallpaper) which comprises a cellulostic fiber paper substrate having a print side and a barrier side. Respective print side and barrier side latex coatings are applied to the paper substrate downstream of the dewatering, press and primary drying sections of a paper-making machine.

Preferably, the paper substrate has a comparatively closed structure with its mechanical properties (e.g. strength and flexibility) being derived from wet end furnish applied to the travelling screen of the paper-making machine. Once the paper web has passed through the dewatering, press and primary drying sections of the paper-making machine, the print side and barrier side coatings can be applied to the paper in a conventional manner. The paper thus coated on 2 sides (C2S) is passed through a secondary dryer and can then be calendered, again in a conventional manner, to final caliper and surface finish. Base sheets in accordance with the invention can be made, using conventional paper-making machines, to have basis weights of about 110 gm/m$^2$ (or lower) to about 175 gm/m$^2$ (or higher).

In accordance with the invention, the furnish applied to the travelling screen is an aqueous suspension comprising the following materials:

| Material | Quantity |
| --- | --- |
| Softwood Kraft pulp | 15–40% by dry weight |
| Hardwood Kraft pulp | 30–55% by dry weight |
| Mineral Filler | 15–30% by dry weight |

The furnish may also contain various known binders (e.g. polyamide epichlorohydrin resin, polyacrylamide polymer) to achieve desired properties of strength, and sizing agents (e.g. alkyl ketene dimer) to provide desired properties of water resistance. Other known paper-making additives, such as, for example, organic polyelectrolytes or colourants may also be included in the furnish.

The fiber qualities and proportions are selected to provide required properties of tensile and tear strength of the finished paper substrate. It is important that strength and flexibility properties of the finished paper substrate are derived from the composition of the wet furnish, and uniformity of application on the travelling screen. If desired, bleached Kraft pulps may be used. The mineral filler quantity and composition are selected to provide sufficient qualities of brightness, opacity and stiffness to the finished paper substrate. Materials usable for the mineral filler include calcium carbonate and titanium dioxide.

The paper produced from the above furnish should preferably have uniform formation and fiber orientation to control wet expansion and contraction, and a "closed" structure to provide a tight surface for coating hold out and uniformity of subsequently applied coating layers. Uniform moisture and caliper profiles of the paper substrate are important for successful use as a wallcovering base sheet.

Prior to calendering, the paper substrate is coated on both sides (print side and barrier side) with respective print side and barrier side coatings. The print side coating is applied in an amount of about 5 to about 20 gm/m$^2$, and is an emulsion of a mineral pigment in liquid latex binder (e.g. styrene acrylic, vinyl acrylic, acrylic, and vinyl acetate). The mineral pigment (e.g. calcium carbonate, and/or clay) is added in sufficient quality and quantity to provide desired properties of surface smoothness and gloss. Optionally, various other additives (e.g. viscosity modifiers, insolubilizers, dispersants, lubricants, pH adjustment, and antifoam agents) can be added alone or in combination to achieve desired working properties of the print side coating.

The barrier side coating is applied in an amount of about 2.5 to about 10 gm/m$^2$, and, like the print side coating, is an emulsion of a mineral pigment in liquid latex binder. The mineral pigment (e.g. calcium carbonate, and/or clay) is added in sufficient quality and quantity to provide desired properties of surface smoothness and gloss, which may be the same as (or different from) that of the print side coating. Optionally, various other known additives (e.g. viscosity modifiers, insolubalizers, dispersants, lubricants, hydrophobic sizing agents, pH adjustment agents, and antifoam agents) can be added alone or in combination to achieve desired working properties of the barrier side coating and thus the barrier side of the finished base sheet.

Using the above-described formulation, base sheets can be manufactured having desired qualities and weights, as required for respective wallcovering products. The following four examples describe specific formulations used to produce respective exemplary base sheets in accordance with the invention.

EXAMPLE A

An economical 110 gm/m$^2$, splitable base sheet for "budget" wallpaper is made as follows:

Paper Substrate:

Fiber furnish consisting of 30 parts by weight bleached softwood Kraft pulp; and 70 parts by weight bleached hardwood Kraft pulp; refined to 300–400 Canadian Standard Freeness (CSF).

Mineral filler at 18% by dry weight, consisting of a blend of precipitated and ground calcium carbonates. As is well understood in the art, ground calcium carbonate improves the "tightness" of paper sheet, while precipitated calcium carbonate produces a "looser", more opaque sheet.

Polyamide epichlorohydrin wet strength resin at about 0.55% by dry weight, to provide 45% wet burst retention.

Alkyl ketene dimer sizing agent at about 0.35% by dry weight, to provide Hercules Size Test greater then 1000 sec. at 80% reflectance.

Anionic polyacrylamide dry strength resin at about 0.25% by dry weight, to serve as wet end charge buffer and provide increased Scott Bond (>250 joules)

Anionic polyelectrolyte retention aid; pH adjustment; colourants; and, antifoam agents as required.

Standard paper-making techniques are used to produce a "closed" compact base sheet for coating.

Print Side Coating:

100 parts by weight of a pigment blend consisting of 70 parts by weight fine ground calcium carbonate; 30 parts by weight ultrafine coating clay.

18 parts by weight styrene acrylic latex binder.

0.3 parts by weight polyacrylate viscosity modifier/waterholding polymer.

0.8 parts by weight stearate compound calendering aid.

The print side coating is applied to a wire side of the paper substrate at a first coater of the paper-making machine located downstream of a primary dryer, in an amount of about 10–13 gm/m$^2$.

Barrier Coating 100 parts by weight acrylic latex;

70 parts by weight fine ground calcium carbonate;

2.5 parts by weight polyacrylate viscosity modifier/waterholding polymer; and 2.0 parts by weight hydrophobic sizing (wax) emulsion.

The barrier side coating is applied to a top side of the paper substrate, at a second coater of the paper-making machine in an amount of about 4 gm/m$^2$.

The wet coatings and paper are dried to final moisture content in a secondary dryer section using a combination of infrared and steam heated dryer "cans." Caliper and smoothness are controlled through standard calendering techniques to form the finished base sheet.

The finished base sheet is subsequently slit into a variety of widths as required by the wallcovering manufacturers, who print, prepaste and convert the base sheet to wallpaper "borders" and "panels".

EXAMPLE B

A 127 gm/M$^2$ base paper for the production of "Branded" wallpapers is made as follows:

Paper Substrate

Fiber furnish consisting of 25 parts by weight bleached softwood Kraft pulp; and 75 parts by weight bleached hardwood Kraft pulp; refined to 300–400 CSF;

Mineral filler at about 15% by dry weight consisting of precipitated calcium carbonate;

Polyamide epichlorohydrin wet strength resin at about 0.50% by dry weight to provide 45% wet burst retention;

Alkyl ketene dimer sizing agent at about 0.3% by dry weight to provide a Hercules Size Test greater than 1000 seconds at 80% reflectance;

Anionic polyacrylamide dry strength resin at about 0.25% by dry weight to serve as a wet end charge buffer and provide increased Scott Bond (>250 joules); and Anionic polyelectrolyte retention aid; pH adjustment; colourants; and, antifoam agents as required.

Standard paper-making techniques are used to produce a "closed" compact paper substrate for coating.

Print Side Coating:

100 parts by weight of a pigment blend consisting of 70 parts by weight fine ground calcium carbonate; 30 parts by weight ultrafine coating clay;

18 parts by weight styrene acrylic latex binder;

0.3 parts by weight polyacrylate viscosity modifier/waterholding polymer;

0.8 parts by weight stearate compound calendering aid; and 0.5 parts by weight epoxy scrub resistance aid.

The print side coating is applied to the wire side of the paper substrate at the first coater of the paper-making machine, in an amount of about 11–14 gm/m$^2$.

Barrier Coating:

100 parts by weight acrylic latex;

70 parts by weight fine ground calcium carbonate;

2.5 parts by weight polyacrylate viscosity modifier/waterholding polymer; and 2.0 parts by weight hydrophobic sizing (wax) emulsion.

The barrier side coating is applied to the top side of the paper substrate, at the second coater of the paper-making machine in an amount of about 4 gm/m$^2$.

The wet coatings and paper are dried to final moisture content in a secondary dryer section of the paper machine using a combination of infrared and steam heated dryer "cans". Caliper and smoothness are controlled through standard calendering techniques to form the finished base sheet.

The finished base sheet is subsequently slit into a variety of widths as required by the wallcovering manufacturers, who print, prepaste and convert the base sheet to wallpaper "borders" and "panels".

EXAMPLE C

A 140 gm/m$^2$ base sheet for the production of "Branded" wallpapers is made as follows:

Base Sheet

Fiber furnish consisting of 15 parts by weight bleached softwood Kraft pulp; and 85 parts by weight bleached hardwood Kraft pulp; refined to 300–400 CSF;

Mineral filler at 25% by dry weight and consisting of a blend of precipitated and ground calcium carbonates;

Polyamide Epichlorohydrin wet strength resin at about 0.50% by dry weights to provide 40% wet burst retention;

Alkyl ketene dimer sizing agent at about 0.35% by dry weight to provide a Hercules Size Test greater then 1000 sec. at 80% reflectance;

Anionic polyacrylamide dry strength resin at about 0.275% by dry weight to act as a wet end charge buffer and provide increased Scott Bond; and Anionic polyelectrolyte retention aid; pH adjustment; colourants; and, antifoam agents as required.

Standard paper-making techniques are used to produce a "closed" compact base sheet for coating.

Print Side Coating:

100 parts by weight of a pigment blend consisting of 70 parts by weight fine ground calcium carbonate; 30 parts by weight ultrafine coating clay;

18 parts by weight styrene acrylic latex binder;

0.3 parts by weight polyacrylate viscosity modifier/waterholding polymer;

0.8 parts by weight stearate compound calendering aid; and 0.3 parts by weight epoxy scrub resistance aid.

The print side coating is applied to the wire side of the paper substrate at the first coater of the paper-making machine, in an amount of about 11–14 gm/m$^2$.

Barrier Coating:

100 parts by weight acrylic latex;

70 parts by weight fine ground calcium carbonate;

2.5 parts by weight polyacrylate viscosity modifier/waterholding polymer; and 2.0 parts by weight hydrophobic sizing (wax) emulsion.

The barrier side coating is applied to the top side of the paper substrate, at the second coater of the paper-making machine in an amount of about 4 gm/m$^2$.

The wet coatings and paper are dried to final moisture content in a secondary dryer section of the paper machine using a combination of infrared and steam heated dryer "cans." Caliper and smoothness are controlled through standard calendering techniques to form the finished base sheet.

The finished base sheet is subsequently slit into a variety of widths as required by the wallcovering manufacturers, who print, prepaste and convert the base sheet to wallpaper "borders" and "panels"

EXAMPLE D 155 and 175 gm/m$^2$ base papers for the production of "Designer" high quality Screen and Gravure printed wallpapers are made as follows:

Base Sheet:

Fiber furnish consisting of 15 parts by weight bleached softwood Kraft pulp; and 85 parts by weight bleached hardwood Kraft pulp; refined to 300–400 CSF;

Mineral filler at about 25–27% by dry weight consisting of a blend of precipitated and ground calcium carbonates;

Polyamide epichlorohydrin wet strength resin at about 0.50% by dry weight to provide 40% wet burst retention;

Alkyl ketene dimer sizing agent at about 0.35% by dry weight to provide a Hercules Size Test greater than 1000 sec. at 80% reflectance;

Anionic polyacrylamide dry strength resin at about 0.275% by dry weight to act as a wet end charge buffer and provide increased Scott Bond; and Anionic polyelectrolyte retention aid; pH adjustment; colourants; and, antifoam agents as required.

Standard paper-making techniques are used to produce a "closed" compact base sheet for coating.

Print Side Coating:

100 parts by weight of a pigment blend consisting of 70 parts by weight fine ground calcium carbonate; and 30 parts by weight ultrafine coating clay'

18 parts by weight styrene acrylic latex binder;

0.3 parts by weight polyacrylate viscosity modifier/waterholding polymer;

0.8 parts by weight stearate compound calendering aid; and 0.3 parts by weight epoxy scrub resistance aid.

The print side coating is applied to the wire side of the paper substrate at the first coater of the paper-making machine, in an amount of about 11–14 gm/m$^2$.

Barrier Coating:

100 parts by weight acrylic latex;

70 parts by weight fine ground calcium carbonate;

2.5 parts by weight polyacrylate viscosity modifier/waterholding polymer; and 2.0 parts by weight hydrophobic sizing (Wax) emulsion.

The barrier side coating is applied to the top side of the paper substrate, at the second coater of the paper-making machine in an amount of about 4 gm/m$^2$.

The wet coatings and paper are dried to final moisture in a secondary dryer section of the paper machine using a combination of infrared and steam heated dryer "cans." Caliper and smoothness are controlled through standard calendering techniques to form the finished base sheet.

The finished base sheet is subsequently slit into a variety of widths as required by the wallcovering manufacturers, who print, prepaste and convert the base sheet to wallpaper "borders" and "panels". This base sheet can also be supplied to "hand screen" craftsmen who produce-limited quantities of custom or antique patterns.

The embodiments of the invention described above are intended to be exemplary only. The scope of the invention is therefore intended to be limited solely by the scope of the appended claims.

I claim:

1. A method of making a base sheet for wallcoverings comprising the steps of:
    a) forming a paper substrate having a print side and a barrier side;
    b) coating the print side and the barrier side of the paper substrate with respective first and second coating mixtures, the first coating mixture containing a scrub resistance aid; and
    c) drying and calendering the paper substrate;
   whereby steps a)–c) are performed in a single pass on a papermaking machine.

2. A method as claimed in claim 1 wherein the print side of the paper substrate is coated prior to coating the base side of the paper substrate.

3. A method of making a base sheet for wallcoverings comprising the steps of:
    a) forming a paper substrate having a print side and a barrier side;
    b) coating the print side and the barrier side of the paper substrate with respective first and second coating mixtures, after the paper substrate passes through wet presses, smoothing press and primary dryer of the paper machine; and
    c) drying to final moisture in a secondary dryer section and calendering the paper substrate;
   whereby steps a)–c) are performed in a single pass on a papermaking machine.

* * * * *